US007520519B2

(12) United States Patent
Smurthwaite, Jr.

(10) Patent No.: US 7,520,519 B2
(45) Date of Patent: Apr. 21, 2009

(54) MANUALLY DRIVEN WHEELCHAIR

(76) Inventor: William J. Smurthwaite, Jr., 1089 Reese Rd., Malvern, PA (US) 19355

( * ) Notice: Subject to any disclaimer, the term of this patent is extended or adjusted under 35 U.S.C. 154(b) by 0 days.

(21) Appl. No.: 11/786,142

(22) Filed: Apr. 10, 2007

(65) Prior Publication Data

US 2008/0252036 A1 Oct. 16, 2008

(51) Int. Cl.
*B62M 1/00* (2006.01)

(52) U.S. Cl. ................. 280/250.1; 250/242.1; 250/246; 250/255; 250/304.1

(58) Field of Classification Search .............. 280/250.1, 280/304.1, 242.1, 246, 255
See application file for complete search history.

(56) References Cited

U.S. PATENT DOCUMENTS

| | | | | |
|---|---|---|---|---|
| 3,937,309 A | | 2/1976 | Schulz et al. | 192/6 A |
| 4,069,725 A | | 1/1978 | Segawa | 74/750 B |
| 4,358,126 A | * | 11/1982 | Mitchell et al. | 280/250.1 |
| 4,453,729 A | * | 6/1984 | Lucken | 280/250.1 |
| 4,560,181 A | * | 12/1985 | Herron | 280/250.1 |
| 4,762,332 A | | 8/1988 | Seol | 280/242 |
| 4,766,772 A | * | 8/1988 | Tsuchie | 74/126 |
| 4,840,076 A | | 6/1989 | Brubaker et al. | 74/143 |
| 4,865,344 A | | 9/1989 | Romero, Sr. et al. | 280/242 |
| 4,993,732 A | | 2/1991 | Wedemeyer | 280/250.1 |
| 5,007,655 A | | 4/1991 | Hanna | 280/250.1 |
| 5,020,815 A | | 6/1991 | Harris et al. | 280/246 |
| 5,263,729 A | | 11/1993 | Watwood et al. | 280/246 |
| 5,401,044 A | * | 3/1995 | Galumbeck | 280/250.1 |
| 5,499,833 A | | 3/1996 | Her et al. | 280/247 |
| 5,632,499 A | | 5/1997 | Hutcherson et al. | 280/246 |
| 5,865,455 A | * | 2/1999 | Taylor | 280/250.1 |
| 5,941,547 A | | 8/1999 | Drake | 280/243 |
| 6,017,046 A | * | 1/2000 | Markovic | 280/250.1 |
| 6,047,980 A | | 4/2000 | Margherita et al. | 280/250.1 |
| 6,234,504 B1 | * | 5/2001 | Taylor | 280/250.1 |
| 6,247,715 B1 | * | 6/2001 | Korosue | 280/242.1 |
| 6,408,961 B1 | | 6/2002 | Chen | 180/6.5 |
| 6,547,018 B1 | | 4/2003 | Choi | 180/11 |
| 6,715,780 B2 | * | 4/2004 | Schaeffer et al. | 280/248 |
| 6,755,430 B1 | | 6/2004 | Watwood et al. | 280/250.1 |

(Continued)

FOREIGN PATENT DOCUMENTS

| | | |
|---|---|---|
| WO | WO 93/02911 | 2/1993 |

(Continued)

*Primary Examiner*—Paul N Dickson
*Assistant Examiner*—Marc A Scharich
(74) *Attorney, Agent, or Firm*—Michael F. Petock, Esq; Petock & Petock, LLC

(57) ABSTRACT

A wheelchair includes a standard foldable frame for supporting a seat with a first and second drive wheel driven by drive levers. Each wheel has a transmission providing for three forward speeds and a reverse speed, as well as a neutral position. The transmissions for the two wheels may be constructed of identical parts with the wheels being caused to rotate in opposite directions from the driving lever merely by reversing the direction of the pawls within the transmissions. The ratchet drive surfaces are provided with pawl engaging surfaces which may be driven in either of two directions. The wheelchair does not require any bulky equipment and the hub containing the transmission may be the size of a bicycle hub. The transmissions in both wheels are shifted by a single control. The wheelchair is provided with disk brakes.

10 Claims, 7 Drawing Sheets

U.S. PATENT DOCUMENTS

| | | | | |
|---|---|---|---|---|
| 6,820,885 | B1 | 11/2004 | Oshimo | 280/243 |
| 6,893,035 | B2 | 5/2005 | Watwood et al. | 280/242.1 |
| 6,916,032 | B2 | 7/2005 | Wong | 280/244 |
| 6,974,399 | B2 * | 12/2005 | Lo | 475/5 |
| 7,344,146 | B2 * | 3/2008 | Taylor | 280/246 |
| 2002/0043781 | A1 | 4/2002 | Mitchell | 280/250.1 |
| 2002/0153691 | A1 * | 10/2002 | Liao et al. | 280/250.1 |
| 2003/0030244 | A1 | 2/2003 | Choi | 280/252 |
| 2004/0104554 | A1 | 6/2004 | Watwood et al. | 280/250.1 |
| 2005/0067807 | A1 | 3/2005 | Harcourt et al. | 280/246 |
| 2005/0167942 | A1 | 8/2005 | Watwood et al. | 280/244 |
| 2005/0275190 | A1 | 12/2005 | Pettit | 280/244 |
| 2006/0208452 | A1 | 9/2006 | Mittelstaedt | 280/250.1 |

FOREIGN PATENT DOCUMENTS

| | | |
|---|---|---|
| WO | WO 99/15397 | 4/1999 |

* cited by examiner

FIG.6
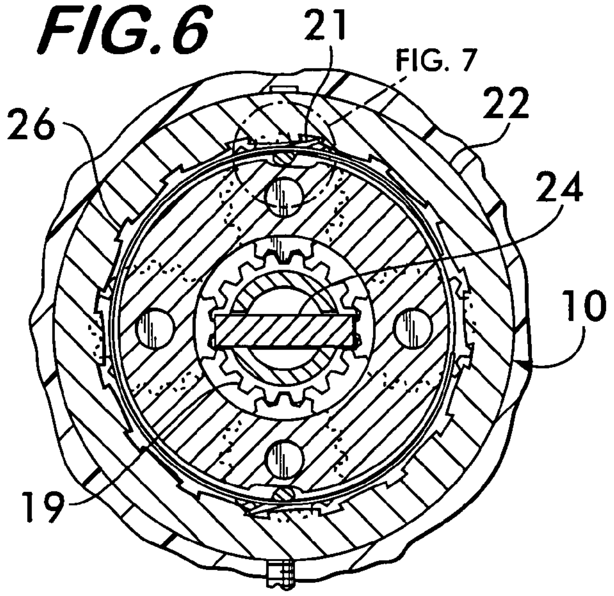
FIG.7
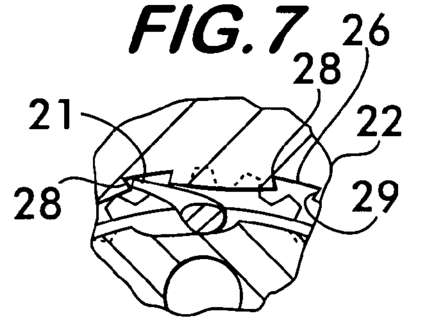
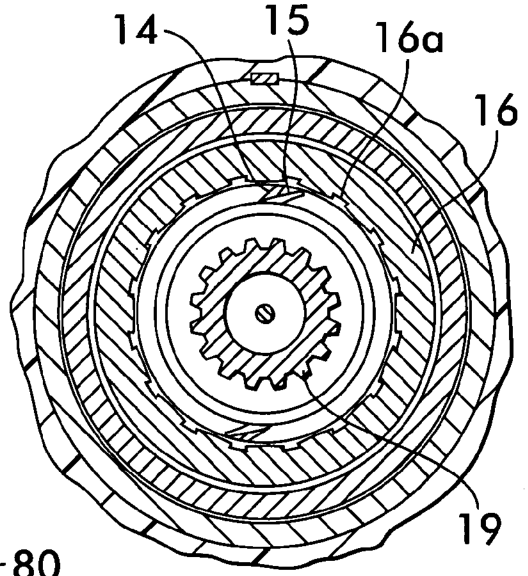
FIG.8
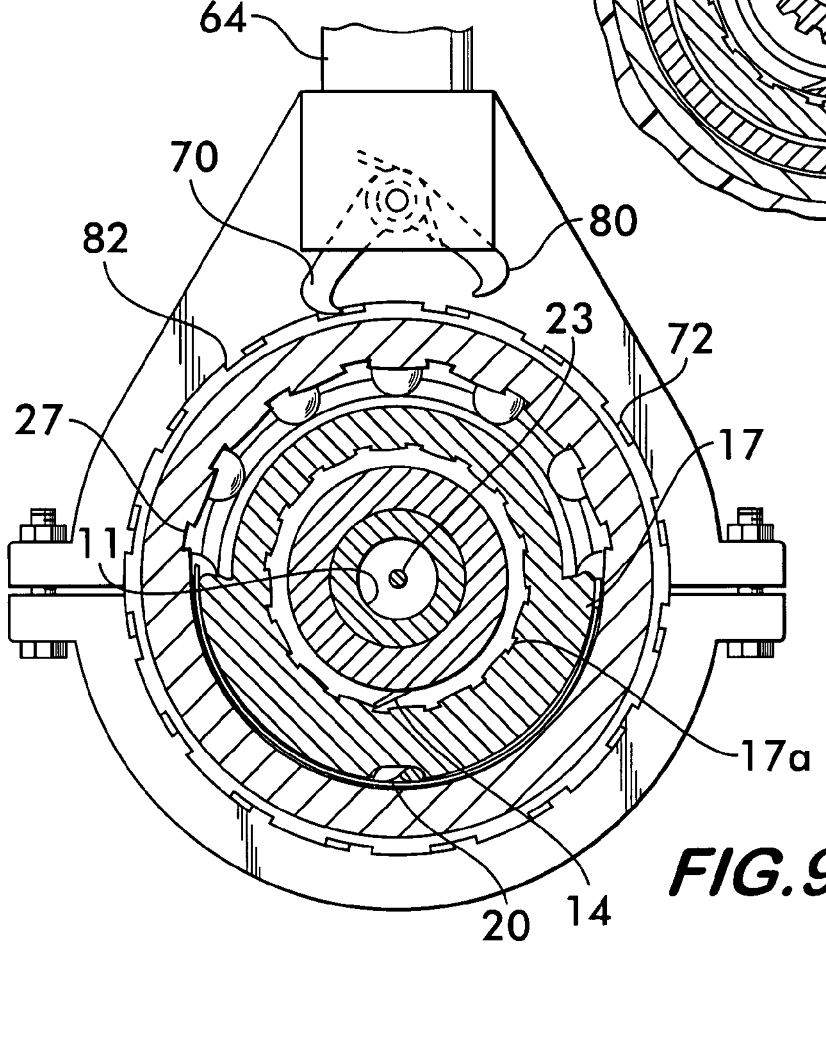
FIG.9

MANUALLY DRIVEN WHEELCHAIR

FIELD OF THE INVENTION

The present invention relates to a manually driven wheelchair. More particularly, the present invention relates to a manually driven wheelchair which is foldable and may be driven by levers in a forward direction in a first, second and third (or more) speed, as well as in a reverse direction, and is provided with a neutral or freewheeling condition and disk brakes.

BACKGROUND OF THE INVENTION

Much work has been done in the field of wheelchairs. However, there is still a need for a wheelchair which may be conveniently powered by a manual means other than the user's hands directly on the wheels of the wheelchair. There is also a need for a wheelchair which may be substantially similar to foldable wheelchairs which may be conveniently folded for transport of the wheelchair in a vehicle or the like and readily unfolded for use.

Further, there is a need for a wheelchair which does not comprise bulky components which detract from the useability of the wheelchair.

There is also a need for a wheelchair which may be driven in a forward direction in multiple speeds or powered torque levels. There is further a need for a wheelchair which may be driven in forward or reverse or in which either one or both of the wheels may be easily put into a neutral or freewheeling condition.

Further, there is a need for a wheelchair which may be economically manufactured.

SUMMARY OF THE INVENTION

The present invention provides or satisfies the needs in the field of wheelchairs as set forth above.

An advantage of the present invention is that it provides a wheelchair which may be manually driven by a pair of levers, one for each wheel, without the user having to handle or place his or her hands directly on the driving wheels.

Another advantage of the present invention is that the wheelchair of the present invention remains foldable for storage or transport and may be readily unfolded for use.

Another advantage of the present invention is that it provides two, three or more speeds of forward motion or two, three or more speeds of torque power which may be easily selected by a thumb operated selector on one of the levers.

Another advantage of the present invention is that it provides a manually lever powered multi-speed forward and a reverse manually lever powered drive, as well as a neutral or freewheeling condition for both wheels.

Another advantage of the present invention is that by selecting on a single speed selector on one of the levers, both transmissions are automatically set to the same transmission speed.

Another advantage of the present invention is that each wheel is provided with a disk brake operated by a disk brake lever on each driving lever.

Another advantage of the present invention is that the wheelchair of the present invention may be economically manufactured wherein the transmissions of both wheels are manufactured, cast, machined or otherwise formed to have identical components and a change of direction for each wheel may be provided by reversal of pawl directions.

Another advantage of the present invention is that it does not contain bulky structure or components.

Another advantage of the present invention is that the transmission for each wheel may be contained in a hub the size of a bicycle hub having a diameter of approximately 1¾" and a length of approximately 3¾".

Briefly and basically, in accordance with the present invention, a wheelchair is provided which includes a foldable frame for supporting a seat. A first and a second wheel are attached to the frame. The first wheel includes a first transmission and the second wheel includes a second transmission. A first manually driven drive lever for driving said first wheel is provided with a pawl mechanism for engaging a ratchet surface on the first transmission. A second manually driven drive lever for driving the second wheel is provided which includes a pawl for engaging a ratchet surface on the second transmission. The first and second ratchet surfaces have a substantially radial leading and trailing edge for engaging the pawl contained on the first and second manually driven drive levers. The pawl of the second drive lever is reversed in direction as contrasted to the pawl of the first drive lever.

By the ratchet surfaces having a substantially radial leading and trailing edge for engaging the pawl, it is meant and intended to cover any leading and trailing edge of a ratchet surface which may engage a pawl. In other words, neither of the leading nor trailing ratchet edge is sloped such that the pawl would slide on it, but is substantially radially formed to engage the pawl. It is understood that there may be substantial deviations from radial in terms of a surface angled from radial, such as the dovetail shape shown in FIG. 8 such that it further enhances the ability of the pawl to engage the surface. Other deviations from radial may also be utilized and are intended to be covered by the aforesaid language, such as a concave or cupping surface formed in the leading and trailing edges of the ratchet surface. In other words, this language is intended to and does cover any ratchet surface which has a pawl engaging surface on both its leading and trailing edge so that by reversal of the pawl, the ratchet surface may be driven in the opposite direction.

In accordance with a presently preferred embodiment of the present invention, the first and second transmission each have a sun gear and a planetary gear arrangement. The transmissions also each have a forward, first, second and third speed or torque power level.

Further, in accordance with the present invention, the first and second drive levers are provided with a second pawl for engaging a second ratchet surface on the first and second transmissions for driving the transmissions in a reverse direction.

In accordance with a presently preferred embodiment, the second ratchet surface, for the reverse direction on each transmission is provided with a substantially radial leading and trailing edge and the second pawl of the second lever is reversed in direction from the second pawl of the first lever.

In accordance with a presently preferred embodiment, the transmissions are provided with a first, second and third forward speed motion which is transferred by pawl and ratchet surfaces. The ratchet surfaces have substantially radial leading and trailing edges and pawls for engaging said ratchet surfaces are reversed in direction in the first and second transmissions whereby the components of the first and second transmission may be the same except for the pawls being reversed in one transmission with respect to the other.

In accordance with a presently preferred embodiment of the present invention, the wheelchair is provided with disk brake calipers mounted on the first and second drive levers for engaging a brake disk on the first and second wheels.

Further, in accordance with the present invention, the wheelchair may be placed in a neutral or freewheeling condition by disengaging the first and second pawls on the first and second drive levers.

Further, in accordance with a preferred embodiment of the present invention, controls for operating the wheelchair in forward or reverse direction are located on an upper portion of the first and second drive levers.

Further, in accordance with a preferred embodiment of the present invention, controls for operating the wheelchair for switching between first, second or third speed are located on an upper portion of one of the first and second drive levers.

Further, in accordance with a presently preferred embodiment of the present invention, the first and second transmissions are connected together by a transmission cable insuring that both transmissions are shifted to the same speed.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 6 is a cross sectional view, partially broken away, taken along line 6-6 of FIG. 3.

FIG. 7 is an exploded cross sectional broken away view of the structure circled in FIG. 6 showing a reversed pawl engaging a double substantially radially edged ratchet surface.

FIG. 8 is a broken away cross sectional view taken along line 8-8 of FIG. 3 showing a pair of pawls and substantially radially double edged ratchet surfaces.

FIG. 9 is a partially broken away cross sectional view taken along 9-9 of FIG. 3 showing the drive pawl for forward and reverse in connection with the double edged substantially radially directed ratchet surfaces.

DETAILED DESCRIPTION OF THE PREFERRED EMBODIMENTS

Figure 1:
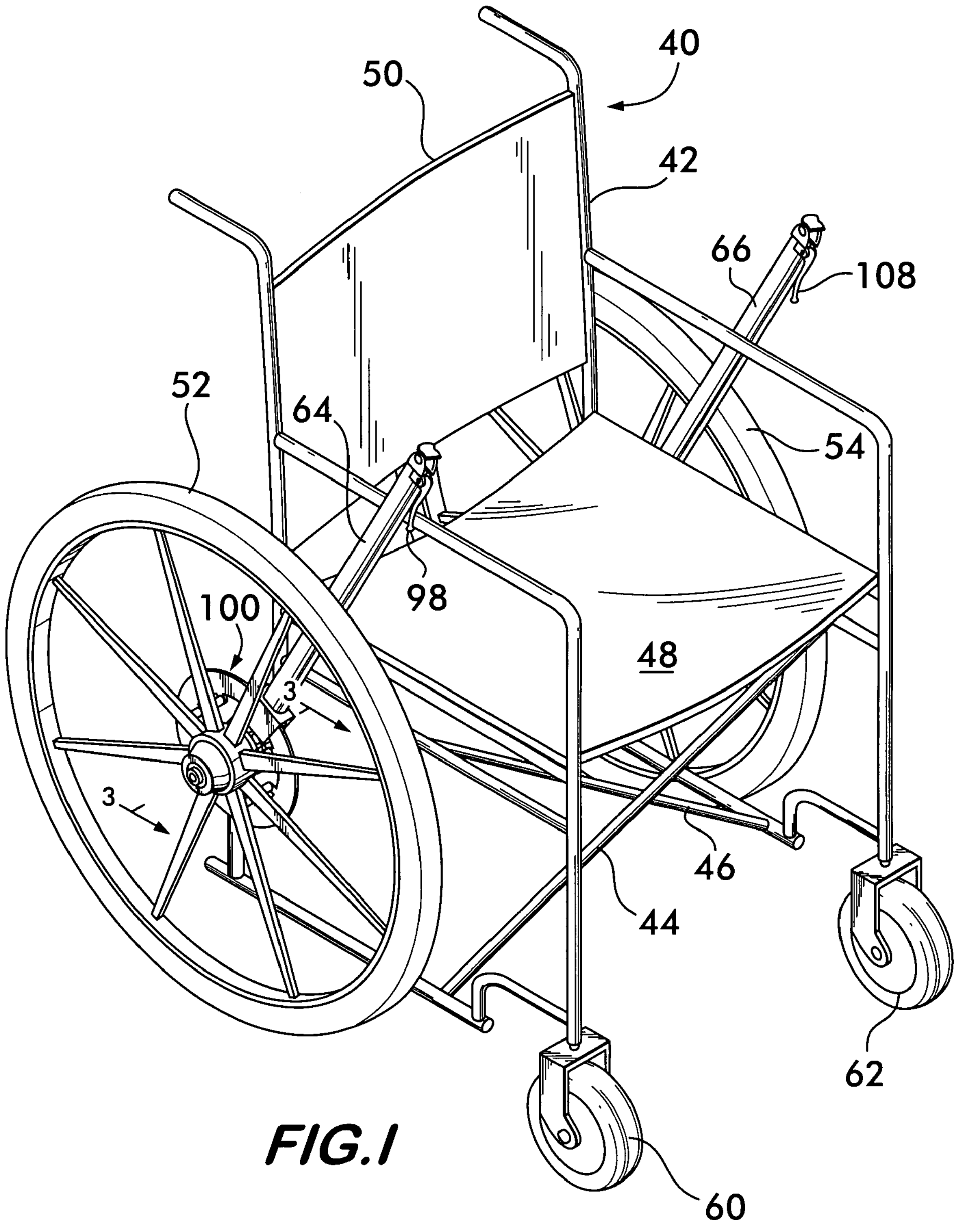
FIG. 1 is a view in perspective of a manually driven wheelchair in accordance with the present invention.

Referring now to the drawings, wherein like numerals indicate like elements, there is shown in FIG. 1 a manually driven wheelchair 40 in accordance with the present invention. Wheelchair 40 comprises a foldable frame 42 including cross braces 44 and 46. Frame 42 is foldable in a conventional manner of conventional wheelchairs and the present invention preserves the ability to fold and unfold the wheelchair as it is commonly done. Foldable frame 42 supports a flexible seat 48, as well as a flexible back support 50. Seat 48 and back support 50 may be made of any suitable flexible material such as leather, fabric, synthetic material or the like so long as it is flexible and sufficiently sturdy to support a person.

Wheelchair 40 is provided with a first wheel 52 and a second wheel 54 which are utilized for propelling the wheelchair. First wheel 52 is mounted to frame 42 by mounting bracket 56 and second wheel 54 is mounted to frame 42 by mounting bracket 58 as may be seen in FIG. 2. Wheelchair 40 is also provided with pivotable front wheels 60 and 62, as is conventional on wheelchairs.

Figure 3:
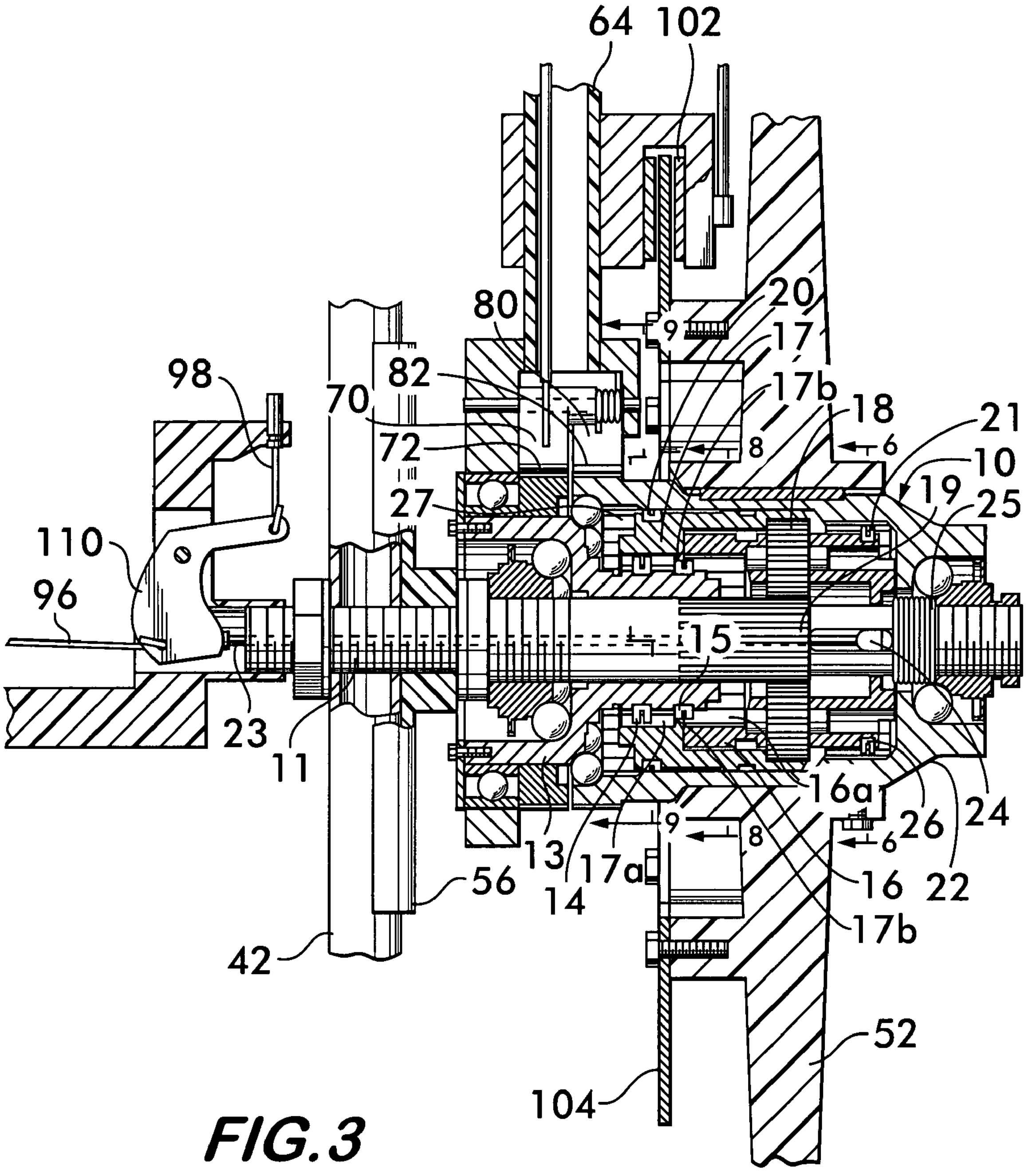
FIG. 3 is a cross sectional view, partially broken away, taken along line 3-3 of FIG. 1 showing the internal structure of the transmission in first gear or low speed gear.
Figure 4:
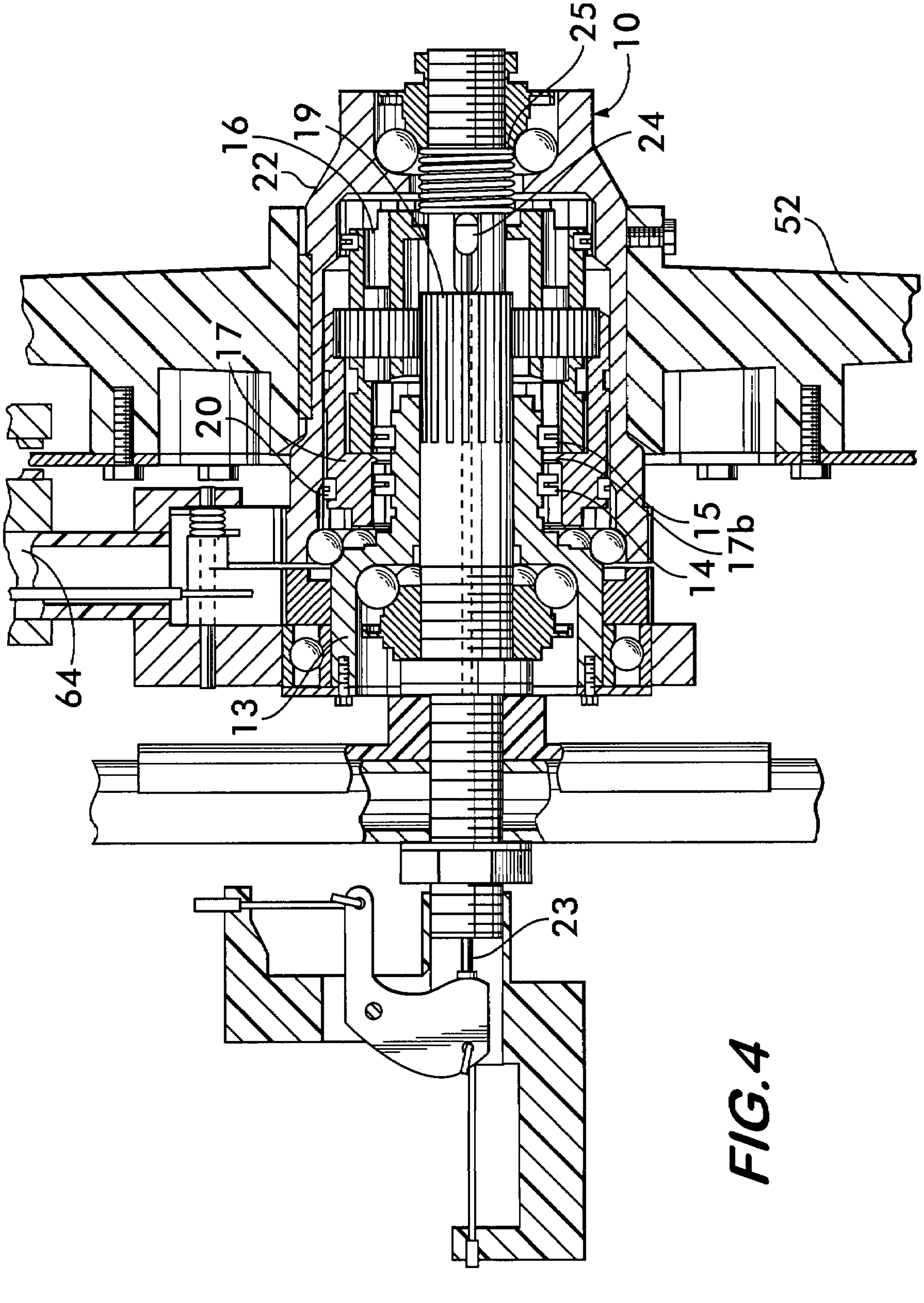
FIG. 4 is a cross sectional view, partially broken away, taken along the same view as FIG. 3 showing the internal structure of the transmission in second gear or medium speed gear.
Figure 5:
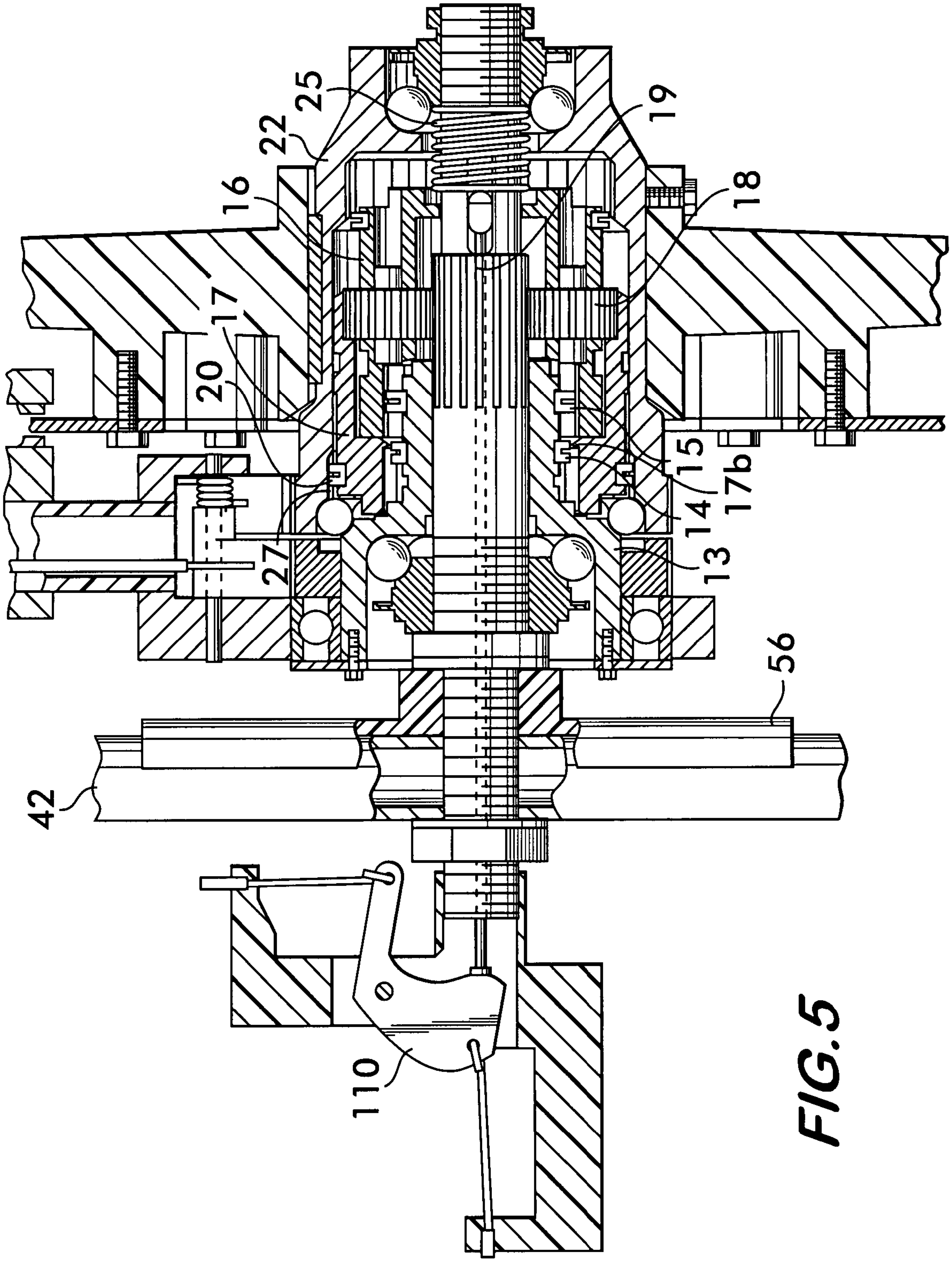
FIG. 5 is a cross sectional view, partially broken away, taken along the same view as that of FIG. 3 showing the transmission in third gear or high speed gear.

Each of the first and second wheels 52 and 54 is provided with a transmission mounted within its hub. FIGS. 3, 4 and 5 illustrate a cross sectional view of the hub contained in right wheel 52. FIG. 3 is a cross sectional view of a transmission in first gear or low speed and high torque. FIG. 4 is a cross sectional view of a transmission in second gear or medium speed and medium torque. FIG. 5 is a cross sectional view of a transmission in third gear or high speed and low torque.

Figure 2:
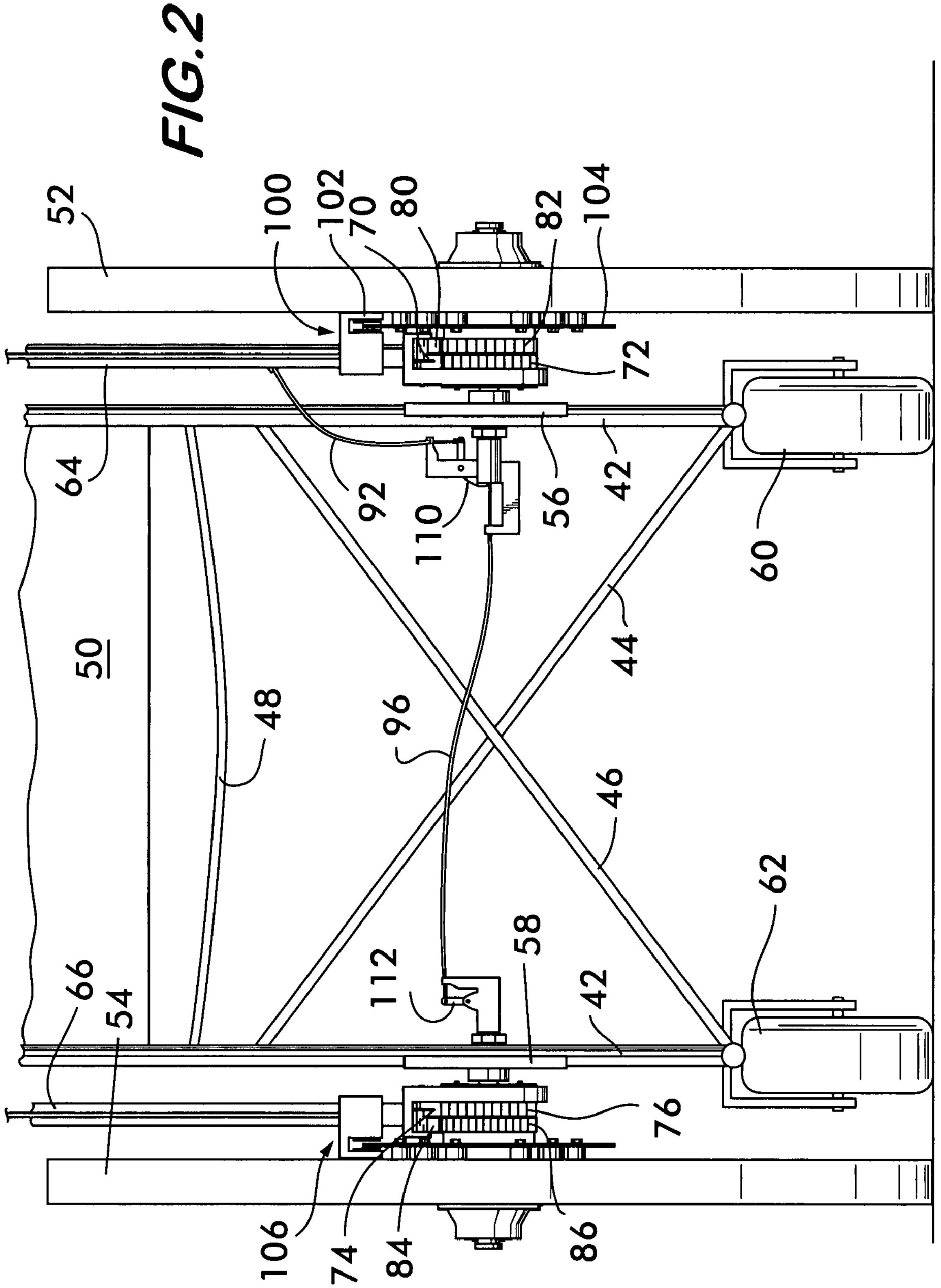
FIG. 2 is a broken away rear view of the manually driven wheelchair in accordance with the present invention illustrating the drive levers, drive pawls and drive ratchet surfaces, shift cable connections and disk brakes as well as other structure shown therein.

Each wheel is driven by a drive lever. Wheel 52 is driven by drive lever 64 and drive wheel 54 is driven by drive lever 66 as illustrated, inter alia, in FIGS. 1 and 2. The lower ends of drive levers 64 and 66 are provided with a pair of drive pawls, one for forward and one for reverse, which may be selectively controlled to engage or disengage ratchet surfaces for driving in a forward direction, reverse direction or with both pawls being disengaged being in a neutral condition. Referring more particularly to FIG. 2, forward drive pawl 70 selectively engages double substantially radially edged ratchet surface 72 for forward driving of wheel 52. Similarly, on the lower end of drive lever 66, forward drive pawl 74 selectively engages forward ratchet surface 76. As will be discussed in greater detail infra, since the left and right wheels are mirror images, rather than having to machine, cast or otherwise form different ratchet surfaces and different hubs and drive members for each wheel, in accordance with the present invention double edge ratchet surfaces are provided wherein the left and right wheel may be substantially identically manufactured with the mirror reversal of the pawl direction.

The lower end of drive lever 64 is provided with a reverse drive pawl 80 which engages a reverse drive ratchet surface 82 which is also double edged. Similarly, as shown in FIG. 2, the lower end of drive lever 66 is provided with a reverse drive pawl 84 which engages a reverse drive ratchet surface 86, which is also double edged.

Figure 10:
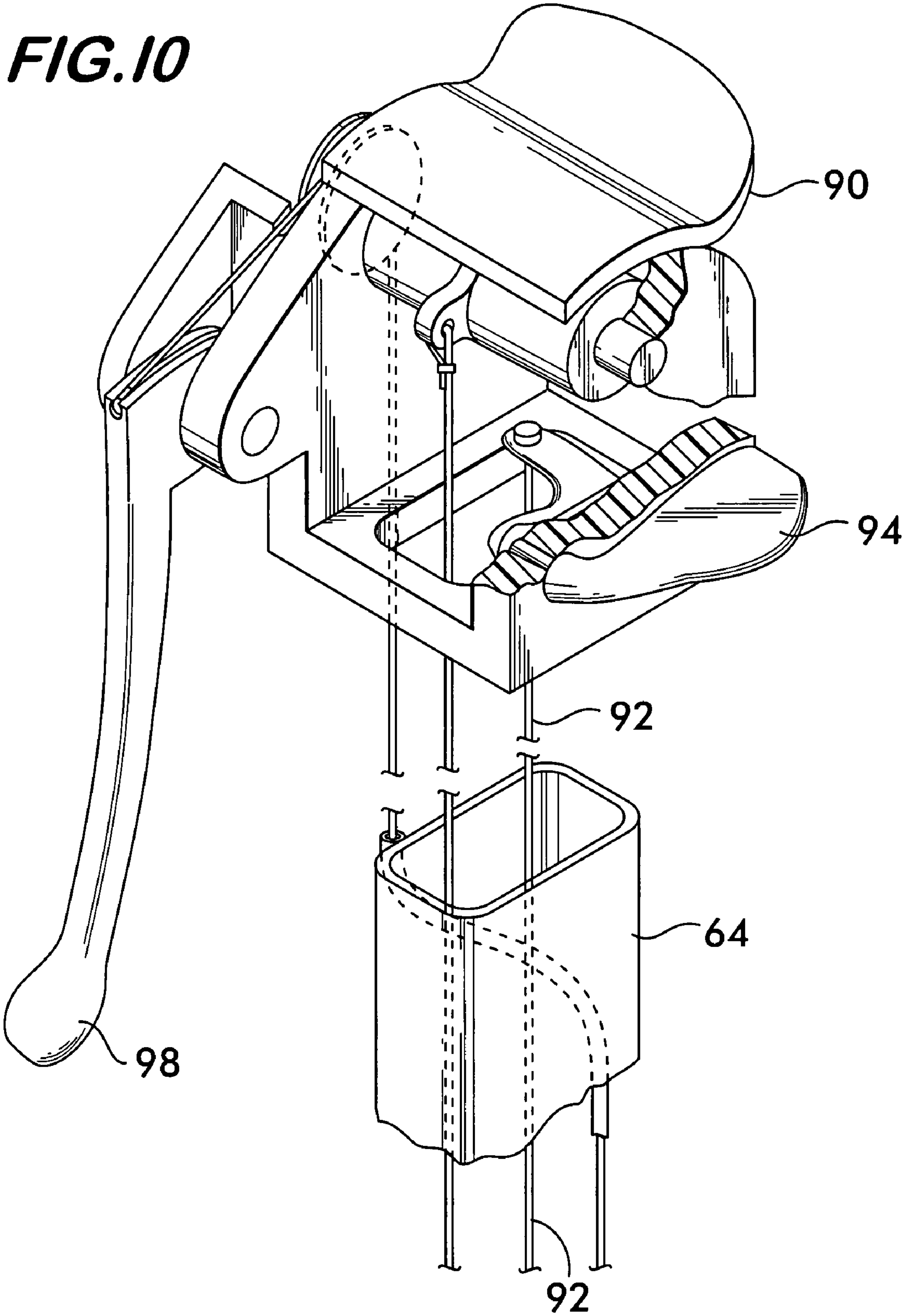
FIG. 10 is a view in perspective, partially broken away of the controls on the upper end of the right drive lever taken from a medial view.

Whether the forward drive pawl engages the forward ratchet surface or the reverse drive pawl engages the reverse drive surface or whether both pawls are disengaged is controlled by a forward/reverse thumb control on the upper end of the drive lever. As illustrated in FIG. 10 for right drive lever 64, forward/reverse thumb control 90 is used to operate pawls 70 and 80 to either engage the forward ratchet surface 72, the reverse ratchet surface 82 or neither ratchet surface for the neutral condition.

Also illustrated in FIGS. 2 and 10 is shift cable 92 which is controlled by thumb operated shift control 94 as shown in FIG. 10. FIG. 10 is a medial view of the upper end of drive lever 64. As will be discussed below, the operation of thumb operated shift control 94 via cable 92 operates a shift rod 23 which slidably moves within a hollow axle 11 against a spring tension in the transmission to shift gears.

Referring now to FIG. 2, the transmission for wheel 54 is connected via cable 96 to the transmission control for the transmission of wheel 52. In this manner, the operation of thump operated shift control 94 controls the transmission of wheel 52 via cable 92 and simultaneously controls the transmission of wheel 54 via connecting shift cable 96.

Also as illustrated in FIGS. 1, 2 and 10, wheel 52 is provided with a disk brake 100 which is controlled by a disk brake lever 98 on the upper end of drive lever 64 as shown in FIG. 10. Squeezing of disk brake lever 98 causes disk brake calipers 102 to engage the disk 104 of disk brake 100. As shown in FIG. 2, the left wheel 54 is also provided with a disk brake 106 operated in a similar manner by a lever 108 on the upper end of drive lever 66.

Referring now to FIG. 3, there is shown a transmission 10 in wheel 52. Transmission 10 may be similar to a three speed bicycle transmission, but is different, inter alia, in that there needs to be a left and a right driven transmission, means must be provided to enable the driving force to come from a lever and the transmission preferably provides a forward and reverse direction in addition to a multi-speed forward direction. In a presently preferred embodiment, transmission 10 would have a dimension of a diameter of approximately 1¾" and a length of approximately 3¾". The general technology of three speed bicycle transmissions is known, for example see U.S. Pat. No. 4,069,725, the teachings of which are incorporated herein by reference.

To select a gear, shift rod 23 is moved in and out of hollow axle 11 of transmission 10. Movement of shift rod 23 causes a subassembly of parts to move internally along a span of axle 11. This subassembly consists of outer gear ring 17, planetary gear cage 16, planetary gears 18 and their associated pawls, 14, 15, 20 and 21 and springs. FIG. 3 shows the transmission in first gear or low speed, high torque gear. First gear is selected by pushing shift rod 23 against internal spring 25 all the way into the body of the unit. This is done by means of cable 92, shift cam 110 and shift rod 23. The same shifting motion is transmitted to the transmission in wheel 54 via cable 96 and shift cam 112. In first gear, the subassembly is all the way to the right as shown in FIG. 3. Third gear is selected by allowing the shift rod 23 to be pushed out or to the left of the transmission as shown in FIG. 5 by internal spring 25. Second gear is selected by placing the shift rod 23 at a middle point between the two extremes.

In transmission 10, all gears stay in mesh with each other at all times. The outer gear ring 17 will always turn a predetermined number of times faster than the planetary gear cage 16 and in a presently preferred embodiment it will turn 1.3 times faster than the planetary gear cage 16, no matter what gear is selected within the transmission. The gears themselves are never shifted. Different final drive ratios are accomplished by selecting different paths of rotational torque through the transmission. Axle 11 always remains stationary as the transmission is mounted to mounting plate 56 which is mounted to frame 42.

Continuing to refer to FIG. 3 which illustrates transmission 10 in first gear, the outer gear ring 17/planetary gear cage 16 subassembly is shifted fully to the right. As rotational energy is applied to drive member 13 for example, by drive pawl 70 in the forward direction from drive lever 64, outer ring drive pawls 14 engage the inner ratchet surface 17*a* of the outer gear ring 17. The planetary gear cage drive pawls 15 slide along drive pawl disengagement ridge 17*b* and are therefore prevented from engaging in the inner ratchet surface of the planetary gear cage 16*a*. In this configuration, the outer gear ring 17 will rotate at the same rate as drive member 13. Rotational energy is transferred from outer gear ring 17 to the planetary gear cage 16 through the planetary gears 18 which are turning against stationary sun gear 9 formed in axle 11. Because the outer gear ring 17 always rotates at a faster rate than the planetary gear cage 16, there is a reduction in the speed of rotation in the planetary gear cage 16. Planetary gear cage to hub drive pawl 21 engages the first/second gear ratchet surface 26 on the inner surface of hub 22. With the outer gear ring 17/planetary gear cage 16 subassembly in its position as illustrated in FIG. 3, the outer gear ring to hub drive pawls 20 slide freely along a smooth inner surface of hub 22, next to the third gear ratchet surface 27. As a result, hub 22 rotates at the same rate as the planetary gear cage 16. The speed of rotation is reduced through the transmission and rotational torque is amplified.

As discussed above, ratchet surfaces and transmission for the other wheel would be the same except that all of the pawls throughout would be reversed in direction. All of the ratchet surfaces are provided with pawl engagement surfaces at their leading and trailing edge and are referred to herein as radially directed leading and trailing edges.

Referring now to FIG. 4, there is shown transmission 10 in second gear or medium speed gear or medium torque. In second gear, the outer gear ring 17/planetary gear cage 16 subassembly is shifted halfway between its first and third gear positions. In this position, both the outer ring drive pawls 14 and the planetary cage drive pawls 15 are off the drive pawl disengagement ridge 17*b* and in contact with their respective inner ratchet surfaces 17*a* and 16*a*. However, because the outer gear ring 17 always rotates faster than the planetary gear cage 16, the outer gear ring drive pawls 14 on the drive member 13 are never able to engage the outer gear ring ratchet surface 17*a*. Rotational energy is routed to the planetary gear cage 16 where it rotates about the stationary sun gear 19. As a result, the outer gear ring 17 rotates 1.3 times faster (or some other times faster) than the planetary gear cage 16. However, its drive pawls 20 are sliding along a smooth region of the hubs inner surface near the third gear internal ratchet surface 27 and do not apply any rotational energy to hub 22. Therefore, planetary gear cage to hub drive pawls 21 engage the first/second gear internal ratchet surface 27. As a result, hub 22 turns at the same rate as drive member 13.

Referring now to FIG. 5 which shows transmission 10 in third gear, the outer gear ring 17/planetary gear cage 16 subassembly is shifted fully to the left. In this position outer gear ring drive pawls 14 slide freely along the drive pawl disengagement ridge 17*b*. The rotational energy of drive member 13 is transferred to the planetary gear cage 16 through the planetary gear cage drive pawls 15. As the planetary gear cage 16 rotates about axle 11, planetary gears 18 rotate about stationary sun gear 19. They in turn transfer their rotational energy to outer gear ring 17, which turns 1.3 times faster (or some other number) than the planetary gear cage 16. In the third gear position, the outer ring to hub drive pawls 20 come in contact with the third gear internal ratchet surface 27 turning the hub at the same rotational rate as the outer gear ring 17. Rotational speed is increased and torque is decreased.

In summary, in first gear, rotational energy is transferred from drive member 13 to outer ring 17, through the planetary gears 18 to the planetary gear cage 16 (at a reduced rotational rate) and to the hub 22 via hub drive pawls 21.

In second gear, rotational energy is transferred from drive member 13 to the planetary gear cage 16 and then directly to hub 22.

In third gear, rotational energy is transferred from the drive member 13, to the planetary gear cage 16 through pawl 5, through the planetary gears 18, to the outer gear ring 17 (at an increased rotational rate) to the hub via pawl 20.

All internal ratchet surfaces, 16*a*, 17*a*, 26 and 27 are bidirectional so that depending upon the direction of the pawl which is inserted, the hub will turn in a desired direction. As will be discussed with respect to FIG. 7, regardless of the direction that the pawl 21 is inserted, it will engage with the internal ratchet surface 26. In accordance with the present invention which requires two mirror images for the wheels to turn in the same direction, the present invention enables reduction in the cost of manufacturing since the parts are all the same for both wheels. To change a left side drive hub to a right side drive hub requires only that all the internal pawls be inserted in the opposite direction.

Referring now to FIG. 6, there is shown a cross sectional view taken along line 6-6 of FIG. 3, which is partially broken away. FIG. 6 shows various structure therein such as sun gear 19, cross member 24 of shift rod 23, planetary gears 18 as well as other structure. However, FIG. 6 should be considered in connection with FIG. 7 as a detailed view of hub drive pawls 21 and first/second gear internal ratchet surface 26 of hub 22. As may be seen in FIGS. 6 and 7, internal ratchet surface 26 is comprised of ratchet teeth having a substantially leading and trailing edges 28 and 29. As set forth above, the leading and trailing edges 28 and 29 are described herein for convenience as being substantially radial, but it is understood that these surfaces may be on an angle from radial as shown in FIG. 7 wherein they may have a dovetail shape which enhances the ability of pawl 21 to engage the ratchet surface. Alternatively, as described above, the leading and trailing edges may have other shapes which enhance the ability of pawl 21 to engage the ratchet surface, such as a cup or concave shape into which the hub drive pawl would engage. It is pointed out that the leading edge becomes a trailing edge when the direction of pawl 21 is changed, such as when it is changed for the opposite wheel. As illustrated between FIGS. 6 and 7, the pawl in FIG. 7 is reversed from the position shown in FIG. 6 as it would be for the wheels on the two different sides.

FIG. 8 is a partially broken away cross sectional view taken along line 8-8 of FIG. 3 showing outer ring drive pawl 14, planetary gear cage drive pawl 15 and the inner ratchet surface 16*a* of the planetary gear cage 16. The direction of these pawls would also be reversed for the other wheel.

Referring now to FIG. 9, there is shown a partially broken away cross sectional view taken along line 9-9 of FIG. 3 showing various structure including outer ring drive pawl 14 and inner ratchet surface 17*a* of the outer gear ring 17. The inner ratchet surface 16*a* of the planetary gear cage 16 shown in FIG. 8 as well as the inner ratchet surface 17*a* of the outer gear ring 17 shown in FIG. 9 are provided with substantially radially directed leading and trailing edges within the meaning as defined above. Accordingly, pawls 14 and 15 may merely be reversed for the mirror image for the other wheel.

FIG. 9 also shows the drive engagement from drive lever 64 for forward drive pawl 70 and reverse drive pawl 80 which also engage forward ratchet surface 72 and reverse ratchet surface 82, respectively, for driving in the forward and reverse directions, respectively. Again, the ratchet surfaces 72 and 82 have substantially radially directed leading and trailing edges and the mirror image for driving of the other wheel only requires that the direction of pawls 70 and 80 be reversed.

The present invention may be embodied in other specific forms without departing from the spirit or essential attributes thereof and, accordingly, reference should be made to the appended claims, rather than to the foregoing specification as indicating the scope of the invention.

I claim:

1. A wheelchair, comprising:

a foldable frame for supporting a seat;

a first and a second wheel attached to said frame;

said first wheel including a first transmission and said second wheel including a second transmission;

a first manually driven drive lever for driving said first wheel, said first drive lever including a first pawl for engaging a first ratchet surface on said first transmission;

a second manually driven drive lever for driving said second wheel, said second drive lever having a second pawl for engaging a second ratchet surface on said second transmission;

said first and said second ratchet surface each having a substantially radial leading and trailing edge for engaging said first pawl and second pawl respectively;

said second pawl of said second drive lever being reversed in direction of ratchet surface engagement as contrasted to said first pawl of said first drive lever; and wherein said first transmission and said second transmission each have a sun gear and a planetary gear arrangement.

2. The wheelchair in accordance with claim 1 wherein each of said first and second drive levers is provided with a third and fourth pawl respectively, for engaging a third and fourth ratchet surface on said first and second transmission, respectively, for driving said transmissions in a reverse direction.

3. The wheelchair in accordance with claim 2 wherein said third ratchet surface of said first transmission and said fourth ratchet surface of said second transmission are provided with substantially radial leading and trailing edges and said fourth pawl of said second drive lever is reversed in direction of ratchet surface engagement from said third pawl of said first drive lever.

4. The wheelchair in accordance with claim 2 wherein the wheelchair may be in a neutral condition or free wheeling condition by disengaging said first, second third and fourth pawls on said first and second drive levers.

5. The wheelchair in accordance with claim 2 wherein controls for operating the wheelchair in a forward or reverse direction are located on an upper portion of said first and second drive levers.

6. The wheelchair in accordance with claim 1 including disk brake calipers mounted on said first and second drive levers for engaging a brake disk on said first and second wheels.

7. A wheelchair, comprising:

a foldable frame for supporting a seat;

a first and a second wheel attached to said frame;

said first wheel including a first transmission and said second wheel including a second transmission;

a first manually driven drive lever for driving said first wheel, said first drive lever including a first pawl for engaging a first ratchet surface on said first transmission;

a second manually driven drive lever for driving said second wheel, said second drive lever having a second pawl for engaging a second ratchet surface on said second transmission;

said first and said second ratchet surface each having a substantially radial leading and trailing edge for engaging said first pawl and second pawl respectively;

said second pawl of said second drive lever being reversed in direction of ratchet surface engagement as contrasted to said first pawl of said first drive lever; and wherein said first transmission and said second transmission each have a forward first, second and third speed.

8. A wheelchair, comprising:

a foldable frame for supporting a seat;

a first and a second wheel attached to said frame;

said first wheel including a first transmission and said second wheel including a second transmission;

a first manually driven drive lever for driving said first wheel, said first drive lever including a first pawl for engaging a first ratchet surface on said first transmission;

a second manually driven drive lever for driving said second wheel, said second drive lever having a second pawl for engaging a second ratchet surface on said second transmission;

said first and said second ratchet surface each having a substantially radial leading and trailing edge for engaging said first pawl and second pawl respectively;

said second pawl of said second drive lever being reversed in direction of ratchet surface engagement as contrasted to said first pawl of said first drive lever; and wherein said first and second transmissions are provided with a first, second and third forward speed, motion being transferred by said pawls and ratchet surfaces, and said pawls being reversed in direction of ratchet surface engagement in said first and second transmissions whereby components of the first and second transmission may be the same except for the pawls being reversed in one transmission with respect to the other.

9. A wheelchair, comprising:

a foldable frame for supporting a seat;

a first and a second wheel attached to said frame;

said first wheel including a first transmission and said second wheel including a second transmission;

a first manually driven drive lever for driving said first wheel, said first drive lever including a first pawl for engaging a first ratchet surface on said first transmission;

a second manually driven drive lever for driving said second wheel, said second drive lever having a second pawl for engaging a second ratchet surface on said second transmission;

said first and said second ratchet surface each having a substantially radial leading and trailing edge for engaging said first pawl and second pawl respectively;

said second pawl of said second drive lever being reversed in direction of ratchet surface engagement as contrasted to said first pawl of said first drive lever; and wherein controls for operating the wheelchair for switching from a first, second or third speed are located on an upper portion of one of said first and second drive levers.

10. The wheelchair in accordance with claim 9 wherein said first and second transmissions are connected together by a transmission cable insuring that both transmissions are shifted to a same speed.

* * * * *

UNITED STATES PATENT AND TRADEMARK OFFICE

CERTIFICATE OF CORRECTION

PATENT NO. : 7,520,519 B2

APPLICATION NO. : 11/786142

DATED : April 21, 2009

INVENTOR(S) : William J. Smurthwaite, Jr.

It is certified that error appears in the above-identified patent and that said Letters Patent is hereby corrected as shown below:

On Cover Page, item (76) line 2:
substitute “Rees” for “Reese”

Signed and Sealed this

Seventh Day of July, 2009

John Doll

JOHN DOLL
*Acting Director of the United States Patent and Trademark Office*